(12) United States Patent
Kohata

(10) Patent No.: US 8,749,826 B2
(45) Date of Patent: Jun. 10, 2014

(54) INFORMATION PROCESSING APPARATUS, CONTROL METHOD AND RECORDING MEDIUM

(75) Inventor: Toru Kohata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 13/370,180

(22) Filed: Feb. 9, 2012

(65) Prior Publication Data

US 2012/0212781 A1 Aug. 23, 2012

(30) Foreign Application Priority Data

Feb. 21, 2011 (JP) ................................ 2011-035182

(51) Int. Cl.
*G06F 3/12* (2006.01)

(52) U.S. Cl.
CPC ............ *G06F 3/1207* (2013.01); *G06F 3/1259* (2013.01); *G06F 3/1224* (2013.01)
USPC .......................................... 358/1.15; 358/1.13

(58) Field of Classification Search
CPC .... G06F 3/1207; G06F 3/1224; G06F 3/1259
See application file for complete search history.

(56) References Cited

U.S. PATENT DOCUMENTS

2003/0223094 A1* 12/2003 Naito ............................ 358/1.15

FOREIGN PATENT DOCUMENTS

| JP | 2004-280572 A | 10/2004 |
| JP | 2006-338127 A | 12/2006 |
| JP | 2009-3532 A | 1/2009 |
| JP | 2009-169040 A | 7/2009 |

* cited by examiner

*Primary Examiner* — Saeid Ebrahimi Dehkordy
*Assistant Examiner* — Lennin Rodriguezgonzale
(74) *Attorney, Agent, or Firm* — Fitzpatrick, Cella, Harper & Scinto (57) ABSTRACT

An information processing apparatus comprises: a determination unit configured to determine whether a communication protocol corresponding to a print queue selected by a user can acquire information from an image forming apparatus when processing a print job; a switching unit configured, when the determination unit has determined that the communication protocol corresponding to the print queue cannot acquire the information from the image forming apparatus, to switch the print queue corresponding to the communication protocol of a determination target of the determination unit to a print queue corresponding to a communication protocol capable of acquiring the information from the image forming apparatus; and an execution unit configured to process the print job using the print queue switched by the switching unit.

7 Claims, 9 Drawing Sheets

INFORMATION PROCESSING APPARATUS, CONTROL METHOD AND RECORDING MEDIUM

BACKGROUND OF THE INVENTION

1. Field of the Invention

The present invention relates to an information processing apparatus, a control method, and a recording medium and, more particularly, to an information processing apparatus capable of switching processing for a print job of an image forming apparatus.

2. Description of the Related Art

An operating system (OS) installed in a host computer is generally provided with a printing system to support printing in an environment where a printer is connected to the host computer that outputs a print request. One known printing system is a CUPS® (Common UNIX Printing System) printing system that runs on Mac OS® X of Apple Computer in the U.S.A. The CUPS printing system is roughly divided into a scheduler, a filter, and a backend. The scheduler mainly manages print jobs. The filter mainly converts image data into data interpretable by a printer. A preprocessing unit called a pre-filter can correct image data. More specifically, the preprocessing unit can perform automatic photo correction, noise removal of digital camera images, and the like. The backend mainly sends data interpretable by a printer to the printer.

When connecting a printer to a host computer on an OS or a printing system, the printer can be used with various connection interfaces (connection I/Fs). Examples are USB (Universal Serial Bus) connection, connection (to be referred to as a network connection hereinafter) by network communication using TCP/IP (Transmission Control Protocol/Internet Protocol) or the like, and Bluetooth® connection. LPR (Line PRinter daemon protocol), IPP (Internet Printing Protocol), and the like are widely used as the communication protocol to perform printing using network connection and supported by various OSes. Some printer vendors implement printing by network connection using communication protocols unique to the vendors. In recent years, to enable printing by network connection from various hosts, the number of printers supporting the plurality of communication protocols is growing.

To make a printer usable on a host computer, generally, a printer driver is installed, and the printer is registered in the host computer. When the printer is registered, a print queue for sequentially processing print jobs using the printer driver is generated on the host computer. The print queue changes between the above-described connection I/Fs or communication protocols. A plurality of print queues can be generated for the same printer.

A technique of determining which connection I/F and communication protocol should be used to establish connection from a host computer to a printer is described in, for example, Japanese Patent Laid-Open No. 2004-280572. In Japanese Patent Laid-Open No. 2004-280572, if a plurality of connection paths exist for a network supporting printer having a plurality of connection interface unit connected to a network, the fastest connection I/F and communication protocol are selected.

There exist connection I/Fs and communication protocols which support so-called bidirectional communication so as to not only write data in a printer but also acquire information from the printer and those which can only write data in a printer but cannot acquire information from the printer.

If a printer supports a plurality of connection I/Fs and communication protocols, the host computer detects printers for all connection I/Fs and communication protocols it supports. At the time of printer registration, the operator selects a printer to be registered in the host computer from the displayed printer list to generate a print queue.

For example, assume that a printer supports both a communication protocol A of OS standard and a communication protocol B unique to the printer vendor as the communication protocol of the network I/F. If the operator is going to register the printer connected to a network, both the printer using the communication protocol A and that using the communication protocol B are displayed in the registrable printer list. In this case, the operator may be unable to determine which communication protocol should be used to generate a print queue. Alternatively, the OS may display the registrable printer list that only includes the printer using the communication protocol A of OS standard by default, and the printer using the communication protocol B unique to the printer vendor may be excluded from the default list. In that case, the print queue using the communication protocol unique to the printer vendor is hard to generate.

If a print queue using a communication protocol incapable of bidirectional communication is generated in accordance with the selection of the operator, the print queue cannot provide a printer driver function that needs bidirectional communication.

For example, since the printer driver and the printing system cannot acquire the remaining ink amount information of the printer main body, information of the remaining ink amount or ink running out cannot be displayed on the host computer to notify the operator of it. In addition, when paper has run out during printing, the paper-out error cannot be displayed on the host computer to notify the operator of it.

When printing a CD label or the like, the operator needs to, for example, insert the CD tray at an appropriate timing. Hence, the printer driver displays an operation instruction corresponding to each state on the host computer while monitoring the change in the printer state using bidirectional communication.

However, if bidirectional communication is impossible, the printer driver cannot detect the change in the printer state and therefore cannot display an operation instruction corresponding to current printer information on the display unit of the host computer. For this reason, the operator cannot know the appropriate timing to set the tray with the CD placed thereon. As described above, the print queue incapable of bidirectional communication lowers the operability because the printer state cannot be acquired.

SUMMARY OF THE INVENTION

The present invention has been made in consideration of the above-described problems, and provides a unit configured, when printing is executed by a print queue incapable of bidirectional communication, to perform printing by a print queue capable of bidirectional communication.

According to one aspect of the present invention, there is provided an information processing apparatus comprising: a determination unit configured to determine whether a communication protocol corresponding to a print queue selected by a user can acquire information from an image forming apparatus when processing a print job; a switching unit configured, when the determination unit has determined that the communication protocol corresponding to the print queue cannot acquire the information from the image forming apparatus, to switch the print queue corresponding to the communication protocol of a determination target of the determination unit to a print queue corresponding to a communication protocol capable of acquiring the information from the image forming apparatus; and an execution unit configured to process the print job using the print queue switched by the switching unit.

According to another aspect of the present invention, there is provided a method of controlling an information processing apparatus, comprising: a determination step of determining whether a communication protocol corresponding to a print queue selected by a user can acquire information from an image forming apparatus when processing a print job; a switching step of, when it is determined in the determination step that the communication protocol corresponding to the print queue cannot acquire the information from the image forming apparatus, switching the print queue corresponding to the communication protocol of a determination target of the determination step to a print queue corresponding to a communication protocol capable of acquiring the information from the image forming apparatus; and an execution step of processing the print job using the print queue switched in the switching step.

According to another aspect of the present invention, there is provided a recording medium storing a program that causes a computer to function as: a determination unit configured to determine whether a communication protocol corresponding to a print queue selected by a user can acquire information from an image forming apparatus when processing a print job; and a switching unit configured, when the determination unit has determined that the communication protocol corresponding to the print queue cannot acquire the information from the image forming apparatus, to switch the print queue corresponding to the communication protocol of a determination target of the determination unit to a print queue corresponding to a communication protocol capable of acquiring the information from the image forming apparatus.

According to the present invention, even when printing by a print queue incapable of bidirectional communication is instructed, printing can be executed by a print queue capable of bidirectional communication without imposing any burden on the operator. Hence, the operator can execute printing while confirming the printer state information and the necessary operation that changes in accordance with the printer state information.

Further features of the present invention will become apparent from the following description of exemplary embodiments (with reference to the attached drawings).

DESCRIPTION OF THE EMBODIMENTS

The embodiments of the present invention will now be described in detail with reference to the accompanying drawings. Note that the following embodiments do not limit the present invention determined by the scope of claims, and not all the combinations of features described in the embodiments are essential to the solving method of the present invention.

First Embodiment

[System Arrangement]

Figure 1:
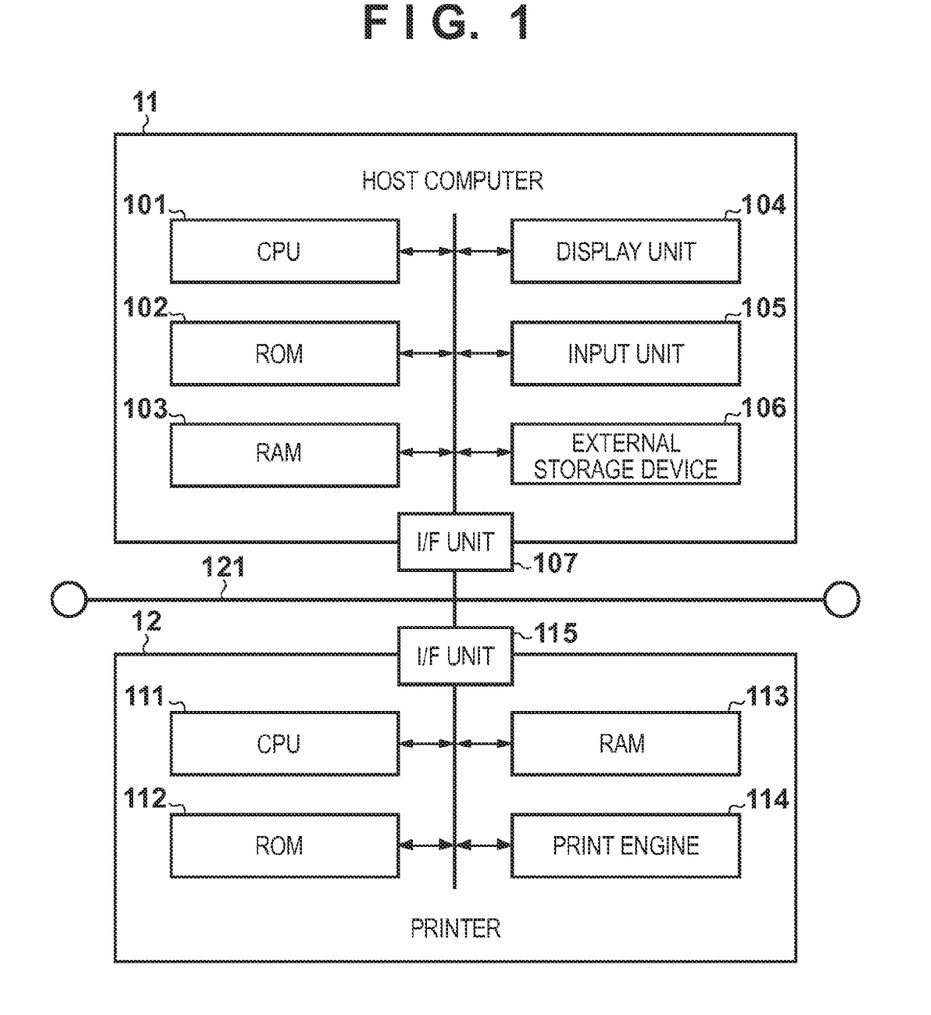
FIG. 1 is a block diagram showing the hardware arrangement of an image forming system according to an embodiment.

The hardware arrangement of an image forming system according to this embodiment will be described with reference to the block diagram of FIG. 1. FIG. 1 illustrates an example of a printing system that can communicate with a printer 12 via a host computer 11 and a communication bus 121 such as Ethernet® or USB. The host computer 11 is an example of an information processing apparatus. In this embodiment, the same OS as the Mac OS X is installed in the host computer 11. The printing system is assumed to be a CUPS printing system 202 introduced in the Mac OS X. Note that although FIG. 1 illustrates only one printer, an arbitrary number of printers can be connected via the communication bus 121.

The host computer 11 is, for example, a personal computer (PC), and includes an interface (I/F) unit 107, a CPU 101, a ROM 102, a RAM 103, a display unit 104, an input unit 105, and an external storage device 106. The host computer 11 sends, to the printer 12, instructions, print data, setting commands, and the like to control the printer 12.

The CPU 101 is a central processing unit that controls the units of the host computer 11, and executes control programs such as a printer driver. The ROM 102 is a read only memory that stores the OS and the like. The RAM 103 is a random access memory on which the work area is expanded by the CPU 101. The external storage device 106 stores various kinds of control programs such as a printer driver. The input unit 105 is formed from a keyboard, a mouse, and the like to operate the host computer 11. The display unit 104 displays messages to confirm information input from the input unit 105, or the user interface screens and messages of a printer driver or an application. The I/F unit 107 sends/receives data to/from the printer 12.

The printer 12 is, for example, an inkjet printer, and includes an I/F unit 115, a CPU 111, a ROM 112, a RAM 113, and a print engine 114. The CPU 111 is a central processing unit that controls the units provided in the printer 12. The ROM 112 is a read only memory that stores a program for controlling the print engine 114, and the like. The RAM 113 is a random access memory that temporarily stores programs necessary for the operation of the print engine 114, set values received from the host computer 11, and the like.

The print engine 114 prints on a printing medium based on print data sent from the host computer 11. The I/F unit 115 has, for example, a function of receiving print data from the host computer 11 and a function of sending the current status of the printer 12 from the printer 12 to the host computer 11. The "status" indicates status data representing the state of the printer 12 the printer 12 can return in response to a request from the host computer 11 connected via the I/F unit 115. The status data is information to notify the processing state of the printer 12 such as "printing" or "standby", or the error state of the printer 12 such as "paper out", "cover open", or "no ink remains".

[Software Configuration]

Figure 2:
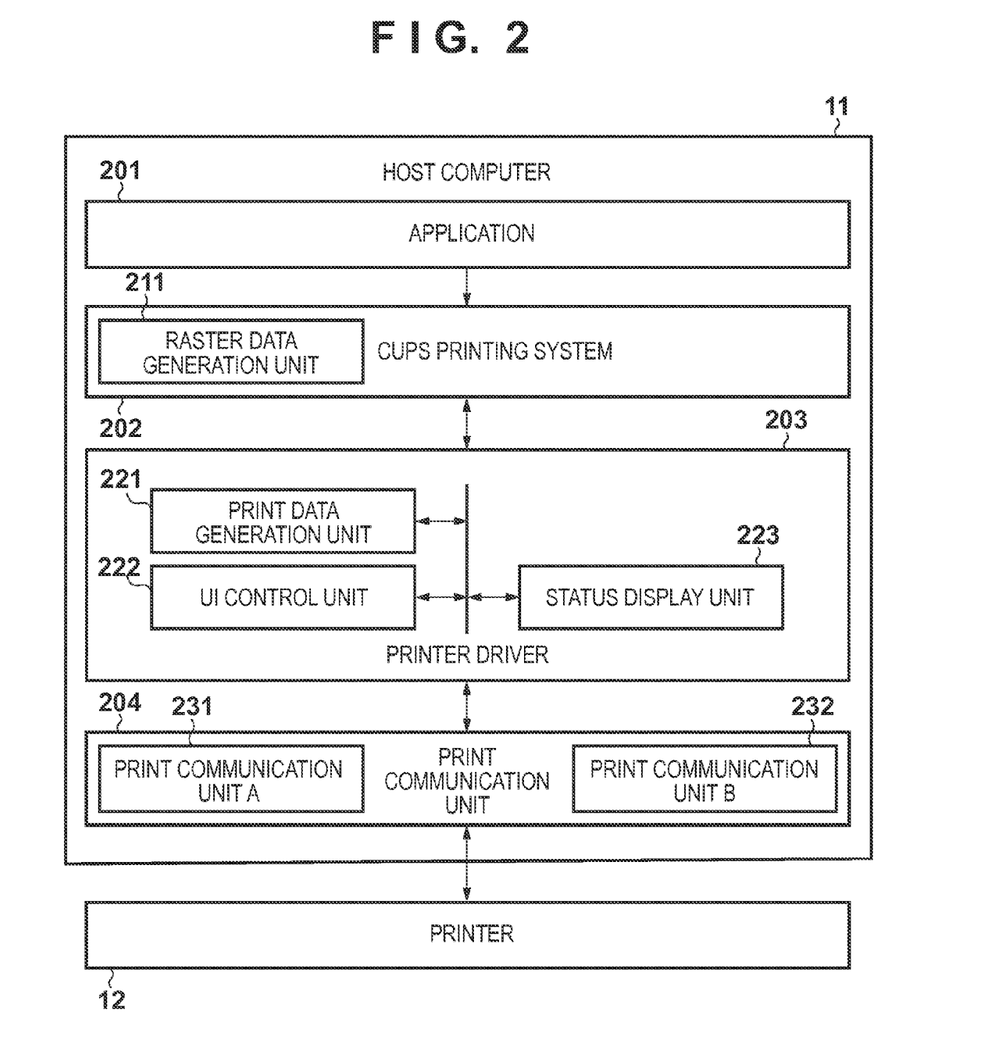
FIG. 2 is a block diagram showing a software configuration according to the first embodiment.

FIG. 2 is a block diagram showing a software configuration according to this embodiment. The host computer 11 includes the CUPS printing system 202 and a printer driver 203. The host computer 11 converts print data of an application 201, via the CUPS printing system 202 and the printer driver 203, into print data in a data format interpretable by the printer 12, and outputs the print data.

The application 201 sends a print request to the CUPS printing system 202. When the print request is output, the application transfers a print job including print setting information and rendering data to the CUPS printing system 202. The print setting information includes information about the paper size and paper type and the print queue to be used for printing and the like. The "application" is software that runs on the OS serving as the basic software of the host computer 11. The application 201 has a function of printing generated data. Examples are word processor software for document creation, image editing software, and software for creating New Year's cards.

The CUPS printing system 202 performs various kinds of print control, including spool processing of rendering data (image data) sent from the application 201 and load/execution of the printer driver 203. A spool file generated at this time by the CUPS printing system 202 has the PDF (Portable Document Format) format that is standard in OS. The spool file will be referred to as PDF print data hereinafter. The CUPS printing system 202 includes a raster data generation unit 211 having a function of converting PDF print data into raster data in accordance with print setting information. The CUPS printing system 202 transfers the print setting information received from the application 201 to the succeeding processing unit.

The printer driver 203 is implemented by software and includes a UI control unit 222, a print data generation unit 221, and a status display unit 223. The printer driver 203 receives raster data and print setting information from the CUPS printing system 202 and performs processing necessary for the print operation. Note that the control by the above-described units is implemented by causing the CPU 101 to execute the printer driver 203.

To cause the printer 12 to execute printing, the UI control unit 222 displays a user interface screen (to be referred to as a driver UI hereinafter) of the printer driver to allow the operator to input an instruction for print execution. The operator designates various kinds of print settings (for example, the type and size of paper serving as a printing medium, the paper feeding method, and the print queue to be used) at the time of printing via the driver UI displayed on the display unit 104 by the UI control unit 222.

The print data generation unit 221 receives the raster data generated by the CUPS printing system 202 and generates print data in an interpretable data format based on the print setting information received from the CUPS printing system 202.

The status display unit 223 displays information such as a printer state or a necessary operation on the display unit 104 based on the status data received from the printer 12. Detailed examples of status data received from the printer are the remaining ink amount information of the printer and information of an error (for example, a paper-out error or a paper jam error) that has occurred in the printer. As already described above, the status data are returned by the printer in response to a request of the host computer. Hence, this is implemented by performing bidirectional communication that allows to acquire data from the printer. If a connection I/F or communication protocol incapable of bidirectional communication is used, status information is not displayed. Whether bidirectional communication is possible depends on the connection I/F and the communication protocol of the connection I/F to be used. For example, when the connection I/F is network connection, and the communication protocol to be used is LPR, the printer cannot perform bidirectional communication. In this embodiment, each of the printer 12 and the host computer 11 has a function of printing using a protocol A capable of bidirectional communication and a protocol B incapable of bidirectional communication as the protocol of network printing.

A print communication unit 204 sends the print data generated by the print data generation unit 221 to the printer 12 and controls printing. The print communication unit 204 also acquires data such as a status sent from the printer. The print communication unit to be used at this time depends on print queue information included in the print setting information. An arbitrary number of print communication units can be loaded. The print queue information changes depending on the connection I/F and the communication protocol of the host computer 11 and the printer 12. Hence, when the same printer uses a different connection I/F and communication protocol, the print communication unit to be used also changes.

For example, when the print queue uses the protocol A capable of bidirectional communication, a print communication unit A 231 corresponding to the protocol A is loaded to the CUPS printing system 202. When the print queue uses the protocol B incapable of bidirectional communication, a print communication unit B 232 corresponding to the protocol B is loaded to the CUPS printing system 202. That is, the print communication unit to be loaded changes depending on the communication protocol and the communication form.

[Print Data Generation Processing]

Figure 3:
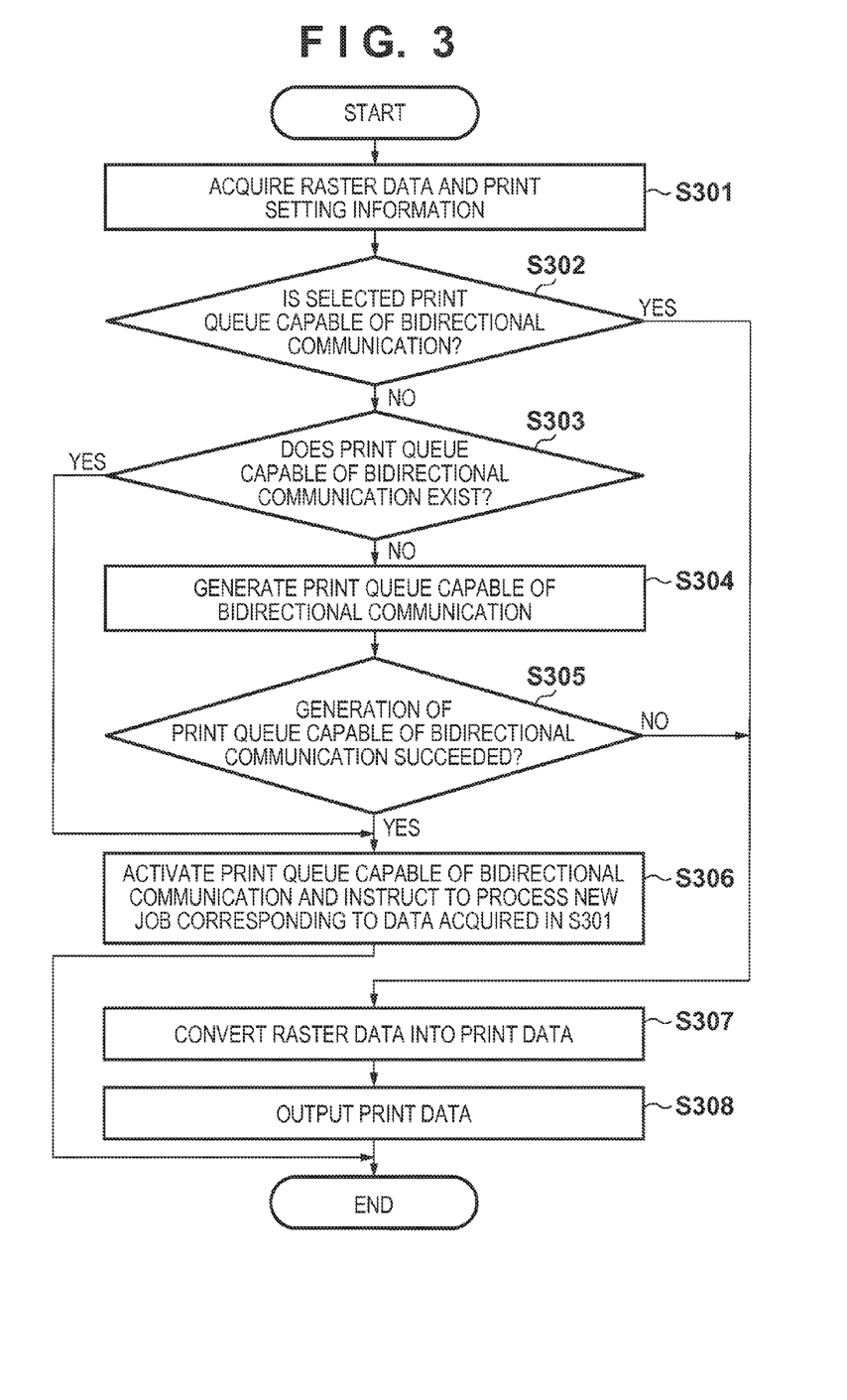
FIG. 3 is a flowchart of a print data generation unit according to the first embodiment.

FIG. 3 is a flowchart for explaining processing of the print data generation unit 221 according to this embodiment. The print data generation unit 221 acquires raster data and print setting information output from the CUPS printing system (S301). The print data generation unit 221 determines whether the acquired raster data and print setting information are data for a print queue capable of bidirectional communication (S302). That is, the print data generation unit 221 determines whether the print queue selected by the print setting information is a print queue capable of bidirectional communication. "Capable of bidirectional communication" indicates that various kinds of information can be acquired from the printer 12 connected to the host computer 11 via the network.

More specifically, the print data generation unit 221 first acquires the print queue name to be used in the current job from the print setting information. Next, the print data generation unit 221 transfers the acquired print queue name to the API of the OS and acquires information called device URI. The device URI contains the information of the connection I/F and protocol of the print queue. The print data generation unit 221 acquires information about the connection I/F to be used in the print queue by referring to the device URI of the print queue to be used.

Figure 4:
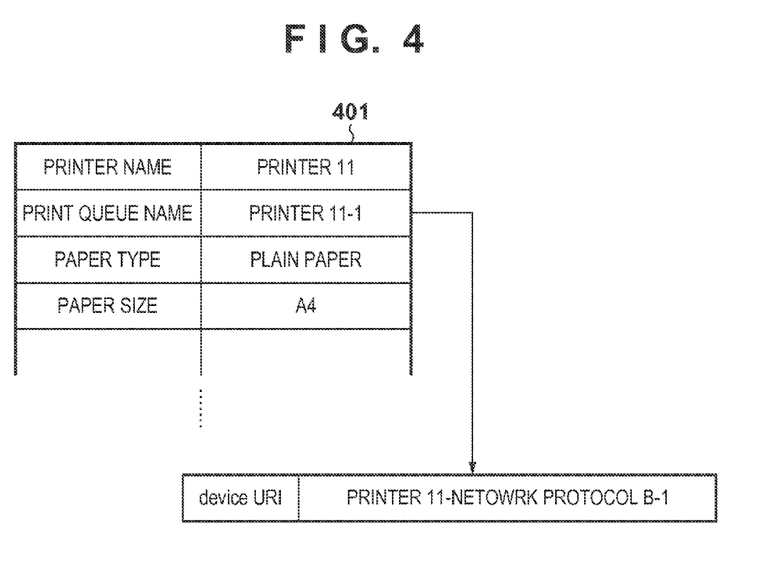
FIG. 4 is a view showing print setting information according to the first embodiment.

FIG. 4 is a block diagram showing an example of data contained in the print setting information. In this example, the print queue name of the print queue to be used in the current job is "printer 11-1", the paper type as a print setting is "plain paper", and the paper size is "A4". In step S302, the print data generation unit 221 first acquires "printer 11-1" as the print queue name of the current job from the print setting information table 401 shown in FIG. 4, and transfers the acquired information to the API of the OS. As the response, the device URI "printer11-network protocol B-1" is obtained. From this device URI, information representing that the connection I/F in the print queue "printer 11-1" is "network", and the protocol to be used is "protocol B" is acquired.

The print data generation unit 221 specifies the connection I/F and the communication protocol from the acquired information, and determines whether it is a communication unit capable of bidirectional communication. For example, when the connection I/F is the USB or the network communication protocol A, it is determined that bidirectional communication is possible. On the other hand, when the communication unit is the LPR or the network communication protocol B, it is determined that bidirectional communication is impossible. With the above-described processing, the print data generation unit 221 determines based on the information acquired in step S301 whether the set print queue is capable of bidirectional communication.

If bidirectional communication is possible (YES in step S302), the print data generation unit 221 directly performs processing of converting the raster data and the print setting information into print data (S307). The print data generation unit 221 then outputs the converted print data to the print communication unit 204 (S308). At this time, the communication unit corresponding to the communication unit is loaded and executed. For example, if the print queue uses the above-described "communication protocol A" capable of bidirectional communication, the print communication unit A 231 corresponding to the communication protocol A is loaded to the CUPS printing system 202. In this case, printing is executed while causing, by bidirectional communication, the status display unit 223 to display the information of the printer 12 and the necessary operation that changes in accordance with the information.

Upon determining that bidirectional communication is impossible (NO in step S302), the print data generation unit 221 confirms whether there exists another print queue capable of bidirectional communication in the I/F used in the current job (S303). More specifically, the print data generation unit 221 inquires of the CUPS printing system 202 about the list of print queue names currently generated on the host computer 11, and acquires device URI information from each print queue name of the list. The print data generation unit 221 then determines based on the acquired information of the connection I/F and the communication protocol whether there exists a print queue capable of bidirectional communication.

Upon determining that there exists no print queue capable of bidirectional communication (NO in step S303), the print data generation unit 221 generates a print queue capable of bidirectional communication in the same communication I/F (S304). First, the print data generation unit 221 generates a print queue using another communication protocol different from that of the print queue used in the current job in the same connection I/F (for example, the same network connection).

More specifically, the print data generation unit 221 inquires of the CUPS printing system 202 about the list of printers currently connected to the host computer 11. The list is individually acquired for each protocol used for communication with the host computer 11. That is, if one printer is connected via a plurality of I/Fs or has a plurality of valid communication protocols in the connected I/F, they are recognized as individual devices and exist on the list.

Next, the print data generation unit 221 checks on the list whether there exists a device that is identical to the currently selected printer 12, uses the same I/F as that of the current print queue incapable of bidirectional communication, and corresponds to the protocol capable of bidirectional communication. If a printer matching the conditions exists on the list, the print data generation unit 221 subsequently checks whether a PPD (Postscript Printer Description) file corresponding to the model exists on the host computer 11. The PPD file describes setting information for each printer model used in the CUPS printing system 202. If the selected printer exists on the list, and the corresponding PPD file exists on the host computer 11, the print data generation unit 221 executes an instruction to generate a print queue for the CUPS printing system 202, thereby generating the print queue capable of bidirectional communication. At this time, the printer information on the list and the PPD file are used as the arguments in the instruction.

If the generation of the print queue using another protocol capable of bidirectional communication has succeeded (YES in step S305), the process advances to step S306 to activate the print queue capable of bidirectional communication and process the job. If the generation of the print queue using another protocol capable of bidirectional communication has failed (NO in step S305), the print data generation unit 221 directly performs processing of converting the raster data and the print setting information into print data (S307). The print data generation unit 221 then outputs the print data to the print communication unit 204 (S308).

The print queue generation fails when, for example, a device that uses the same I/F as that of the current print queue incapable of bidirectional communication and corresponds to the protocol capable of bidirectional communication does not exist on the above-described list of printers connected to the host computer 11. The print queue generation also fails when no PPD file corresponding to the printer model exists on the host computer 11.

In step S308, the communication unit corresponding to the communication protocol is loaded and executed. For example, when the print queue uses the above-described protocol B incapable of bidirectional communication, the print communication unit B 232 corresponding to the protocol B is loaded to the CUPS printing system 202. In this case, since the print communication unit B 232 cannot perform bidirectional communication, print processing is executed without causing the status display unit 223 to display the information of the printer 12 and the necessary operation that changes in accordance with the information.

Upon determining that a print queue using a protocol capable of bidirectional communication already exists (YES in step S303), the process advances to step S306 to activate the print queue capable of bidirectional communication and process the job.

In step S306, the print data generation unit 221 instructs the CUPS printing system 202 to issue a new job corresponding to the data acquired in step S301 for the print queue capable of bidirectional communication generated in step S305 or already existing on the host computer 11. More specifically, first, the print data generation unit 221 generates print setting information by changing the print queue information to the print queue capable of bidirectional communication. The print data generation unit 221 inputs the print setting information and the raster data acquired in step S301 to instruct the CUPS printing system 202 to issue a new job. Then, the newly issued job is added to the print queue capable of bidirectional communication. Note that at this time, the default printer stored in the CUPS printing system 202 as the default print queue may be rewritten to the print queue capable of bidirectional communication. When the processing of step S306 has ended, the print data generation unit 221 ends the processing. At this time, print data output to the existing job is not performed.

The CUPS printing system 202 inputs the above-described new job to be executed by the instruction to the print queue capable of bidirectional communication, which is instructed and newly activated in step S306, so as to start processing the job. The print data generation unit 221 thus executes the processing for the "job for the print queue capable of bidirectional communication" activated by itself again in accordance with the flowchart of FIG. 3.

First, in step S301, the print data generation unit 221 acquires raster data and print setting information output from the CUPS printing system. In step S302, the print data generation unit 221 determines whether the selected print queue is capable of bidirectional communication. In this case, since the job uses the print queue capable of bidirectional communication, the determination in step S302 is "YES", and the process advances to step S307. The print data generation unit 221 converts the raster data into print data (S307), and outputs it to the print control unit (S308). At this time, the print communication unit A 231 corresponding to the print queue capable of bidirectional communication is loaded to the CUPS printing system 202. In this case, printing can be executed while performing bidirectional communication and causing the status display unit 223 to display the information of the printer 12 and the necessary operation that changes in accordance with the information.

As described above, even when printing by a print queue incapable of bidirectional communication is instructed, printing is executed by newly generating a print job for a print queue capable of bidirectional communication. This allows to execute print processing while notifying the operator of the state of the printer 12 and the necessary operation based on it.

Note that the processing shown in FIG. 3 may be performed only when the print setting information of a print job represents that the processing of the print job requires bidirectional communication, and the selected print queue is incapable of bidirectional communication. That is, when the print job does not need bidirectional communication, and a print queue incapable of bidirectional communication is selected, the processing of generating a new print queue may be omitted.

The newly generated print queue capable of bidirectional communication may be continuously held or deleted after completion of the processing of the print job.

Second Embodiment

The second embodiment will be described next. Note that the drawings common to those of the first embodiment and a description thereof will be omitted, and only different points will be explained below. In the first embodiment, the print data generation unit 221 generates a print queue capable of bidirectional communication and changes the output destination printer, thereby outputting print data to the print queue capable of bidirectional communication. In the second embodiment, a printer driver 203 further includes a data processing unit 501 for processing PDF print data. A print data generation unit 221 generates a print job for a print queue capable of bidirectional communication using the PDF print data temporarily stored by the data processing unit 501. This will be described below with reference to the accompanying drawings.

Figure 5:
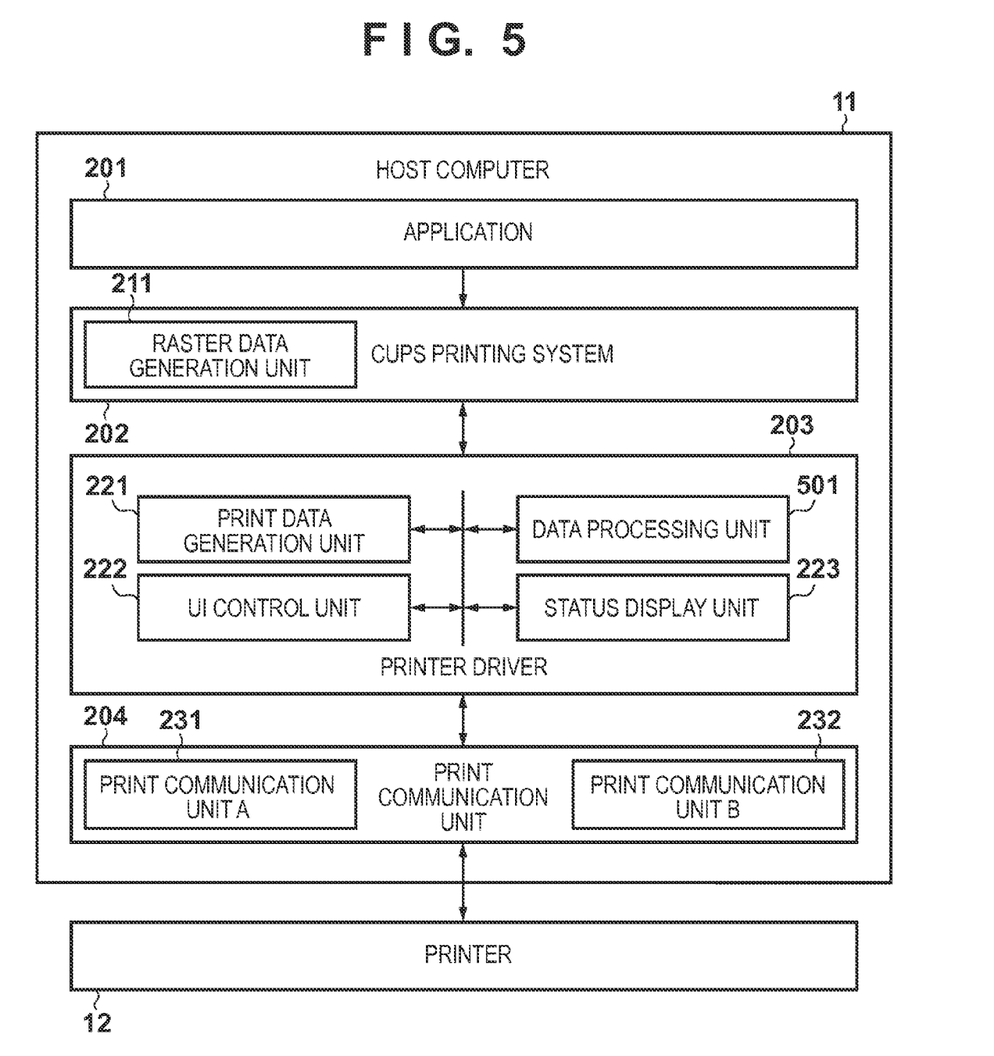
FIG. 5 is a block diagram showing a software configuration according to the second embodiment.

FIG. 5 is a block diagram showing a software configuration according to the second embodiment. Unlike the arrangement of the first embodiment, the printer driver 203 includes the data processing unit 501 in addition to the print data generation unit 221, a UI control unit 222, a status display unit 223. The components other than the data processing unit 501 are the same as in the first embodiment, and a description thereof will not be repeated.

The data processing unit 501 can receive PDF print data prior to a raster data generation unit 211 and perform preprocessing necessary for print processing for the received PDF print data. The data processing unit 501 according to this embodiment performs processing of storing PDF print data in an external storage device 106. The PDF print data processed by the data processing unit 501 is converted into raster data by the raster data generation unit 211 of a CUPS printing system 202 described above. The raster data is transferred to the print data generation unit 221.

[Data Processing]

Figure 6A:
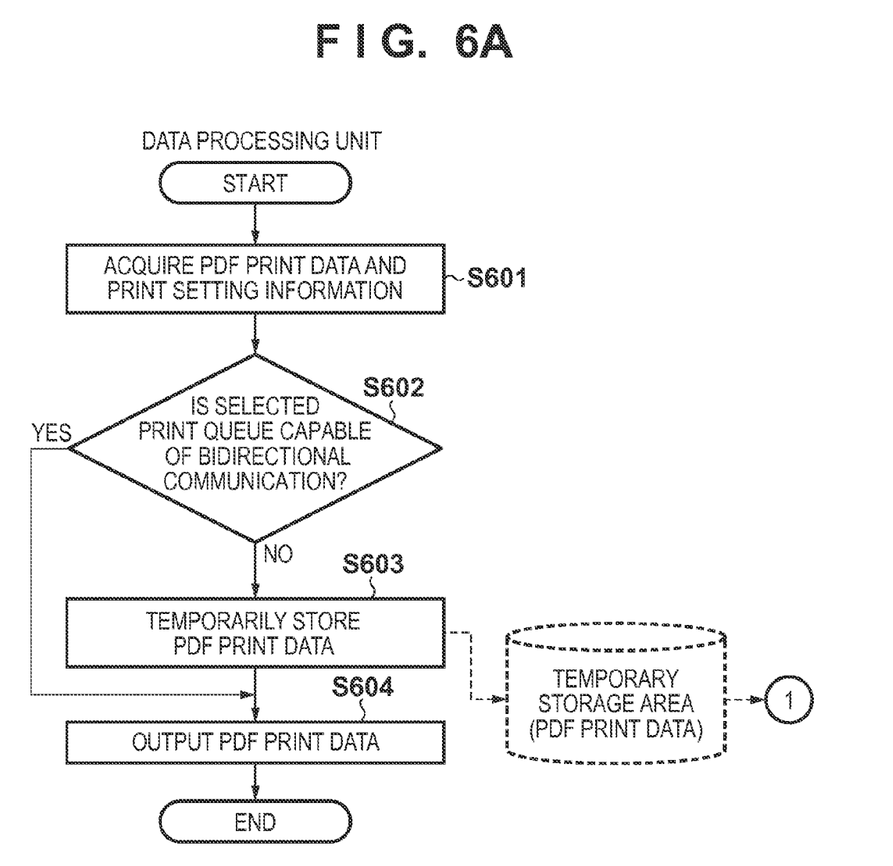
FIGS. 6A and 6B are flowcharts of a print data generation unit and a data processing unit according to the second embodiment.

FIG. 6A is a flowchart for explaining processing of the data processing unit 501 according to this embodiment. The data processing unit 501 acquires sent PDF print data and print setting information (S601). The data processing unit 501 determines whether the printer selected in the print setting information is capable of bidirectional communication (S602). This determination processing is the same as that performed by the print data generation unit 221 in step S302 of the first embodiment. Upon determining that the print queue is capable of bidirectional communication (YES in step S602) the process advances to step S604. Upon determining that the print queue is incapable of bidirectional communication (NO in step S602), the data processing unit 501 stores the PDF print data in the external storage device 106 (storage area) in step S603. In step S604, the data processing unit 501 outputs the PDF print data to the CUPS printing system 202.

The CUPS printing system 202 causes the raster data generation unit 211 to output raster data based on the received PDF print data and the print setting information. The output raster data is acquired by the print data generation unit 221.

[Print Data Generation Processing]

Figure 6B:
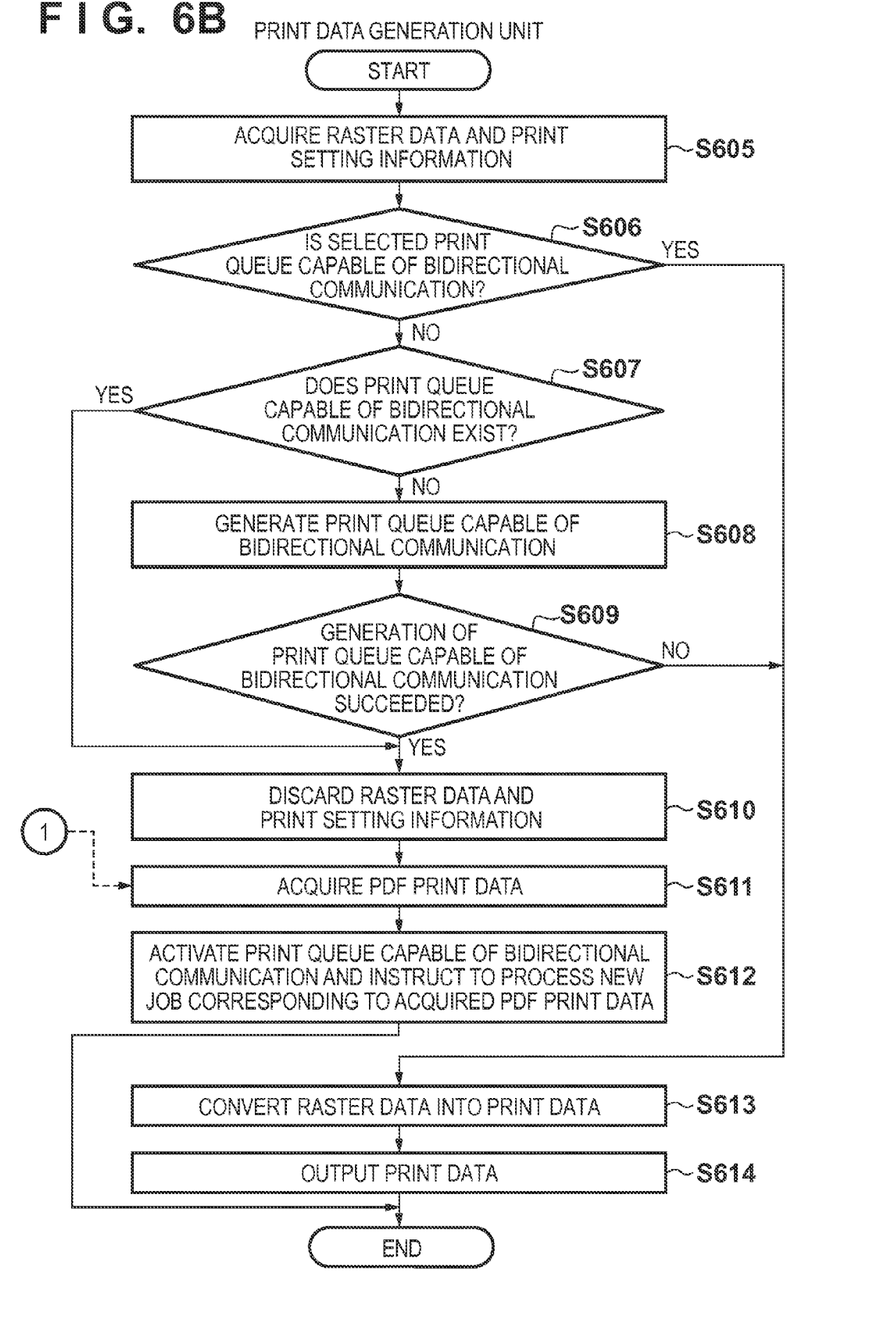

FIG. 6B is a flowchart for explaining processing of the print data generation unit 221 according to this embodiment. The processing of the print data generation unit 221 in steps S605 to S609 is the same as in the first embodiment and corresponds to steps S301 to S305.

After a print queue capable of bidirectional communication is generated in step S609, the print data generation unit 221 discards the raster data acquired in step S605 (S610). Next, the print data generation unit 221 acquires the PDF print data stored in the external storage device 106 by the data processing unit 501 (S611). In step S612, the print data generation unit 221 activates the print queue capable of bidirectional communication, and instructs the CUPS printing system 202 to execute a new job corresponding to the PDF print data acquired in step S611 (S612).

More specifically, first, the print data generation unit 221 generates print setting information by changing the print queue information to the print queue capable of bidirectional communication. The print data generation unit 221 inputs the print setting information and the PDF print data acquired in step S611 to instruct the CUPS printing system 202 to issue a new job. The print data generation unit 221 activates the print queue capable of bidirectional communication, and instructs to execute the newly issued job. The job newly issued by the CUPS printing system 202 is thus added to the print queue capable of bidirectional communication. Note that at this time, the default printer stored in the CUPS printing system 202 as the default print queue may be rewritten to the print queue capable of bidirectional communication. As in the first embodiment, when the processing of step S612 has ended, the print data generation unit 221 ends the processing.

The CUPS printing system 202 inputs the newly issued job to the print queue capable of bidirectional communication, which is instructed and newly activated in step S612, so as to start processing the job. In this embodiment, the input data of the new job is the PDF print data acquired in step S611. Hence, the data processing unit 501 first performs the processing shown in FIG. 6A. In this case, since the job corresponds to the print queue capable of bidirectional communication, the data processing unit 501 determines "YES" in step S602. The data processing unit 501 outputs the PDF print data to the CUPS printing system 202 in step S604, and ends the processing. The CUPS printing system 202 causes the raster data generation unit 211 to convert the received PDF print data into raster data and output it. The print data generation unit 221 acquires the output raster data and performs the processing shown in FIG. 6B again.

The print data generation unit 221 similarly determines in step S606 whether bidirectional communication is possible. Since the job uses the print queue capable of bidirectional communication, the print data generation unit 221 determines "YES", and the process advances to step S613.

The subsequent processing is the same as in the first embodiment. The print data generation unit 221 generates print data from the raster data (S613). The print data generation unit 221 outputs the generated print data to a print communication unit 204 (S614). The print communication unit 204 sends the print data generated by the print data generation unit 221 to the printer and controls printing. Note that as in the first embodiment, the print communication unit 204 is loaded in correspondence with each print queue, and a print communication unit A 231 used in a print queue capable of bidirectional communication is loaded to the CUPS printing system 202. At this time, the status display unit 223 displays status data sent from the printer.

This allows to execute printing while performing bidirectional communication and causing the status display unit 223 to display the information of a printer 12 and the necessary operation that changes in accordance with the information.

Third Embodiment

The third embodiment will be described next. Note that the drawings common to those of the above-described embodiments and a description thereof will be omitted, and only different points will be explained below. In the above-described embodiments, the print data generation unit 221 of the printer driver 203 switches from a print queue incapable of bidirectional communication to a print queue capable of bidirectional communication. In this embodiment, the print queue is switched, based on a user instruction, on a driver UI displayed by a UI control unit 222. In addition, the UI control unit 222 generates a print queue capable of bidirectional communication, unlike the above-described embodiments. Note that the software configuration of the third embodiment is the same as that shown in FIG. 2 described in the first embodiment.

Figure 7:
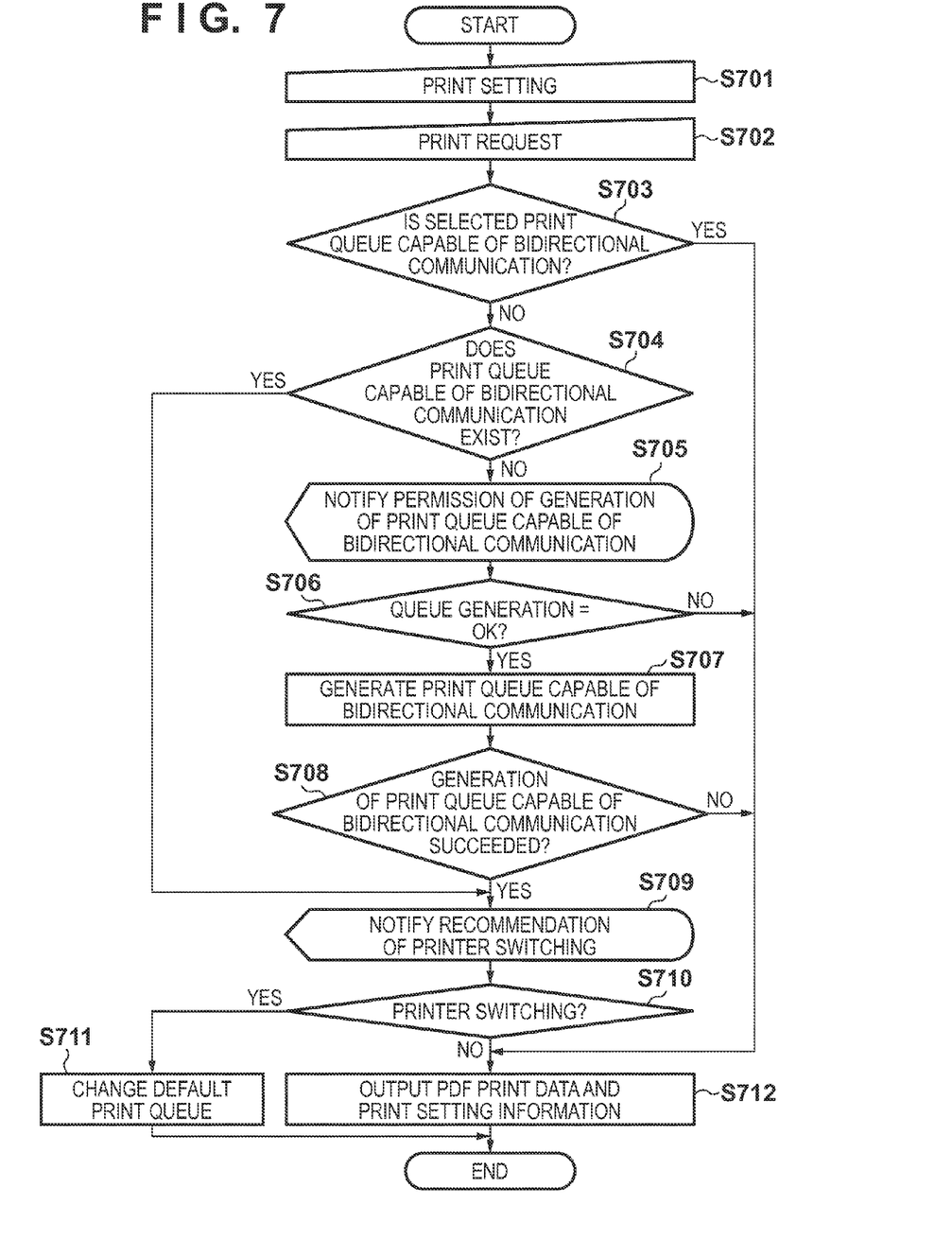
FIG. 7 is a flowchart of a UI control unit according to the third embodiment.

FIG. 7 is a flowchart for explaining processing of the UI control unit 222 according to the third embodiment. When a print request is executed from an application 201, the UI control unit 222 of a printer driver 203 is invoked. The UI control unit 222 adds print setting information to PDF print data to be printed (S701). The print setting information added here also contains information representing a print queue to execute printing. After the print setting, the operator presses a print execution button on the driver UI to execute the print request (S702).

When the print request is executed, the UI control unit 222 determines whether the print queue of the current print setting is capable of bidirectional communication (S703). This determination processing is the same as that of step S302 of the first embodiment and step S606 of the second embodiment. Upon determining that the print queue is capable of bidirectional communication (YES in step S703), the UI control unit 222 outputs the PDF print data and the print setting information to a print data generation unit 221 (S712). Upon determining that the print queue is incapable of bidirectional communication (NO in step S703), the UI control unit 222 determines whether there exists another print queue capable of bidirectional communication in the I/F used in the current job (S704). The determination processing performed in step S704 is the same as that of step S303 of the first embodiment and step S607 of the second embodiment.

If no print queue capable of bidirectional communication exists (NO in step S704) processing of generating a print queue capable of bidirectional communication starts. First, the UI control unit 222 outputs a notification to the operator to confirm whether to generate a print queue capable of bidirectional communication (S705).

Figure 8A:
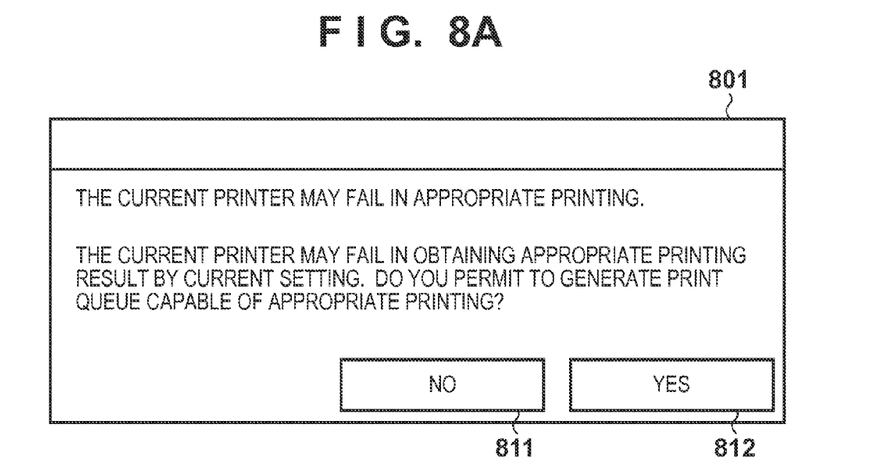
FIGS. 8A and 8B are views showing a notification displayed for the operator by the UI control unit according to the third embodiment.

FIG. 8A shows a dialogue 801 that is an example of the dialogue displayed in step S705. In step S706, the UI control unit 222 determines the user selection in the dialogue 801. If a "YES" button 812 in the dialogue 801 is pressed, the process advances to step S707. If a "NO" button 811 in the dialogue 801 is pressed, the process advances to step S712. In step S712, the UI control unit 222 outputs the PDF print data while maintaining the print setting to use the current print queue.

The processing of generating a print queue capable of bidirectional communication in step S707 is the same as that of step S304 of the first embodiment and step S608 of the second embodiment. If the print queue generation has succeeded in step S707 (YES in step S708), the UI control unit 222 displays the new print queue capable of bidirectional communication on the driver UI (S709). If the print queue generation has failed (NO in step S708), the process advances to step S712, and the UI control unit 222 outputs the PDF print data while maintaining the setting to use the current print queue.

Figure 8B:
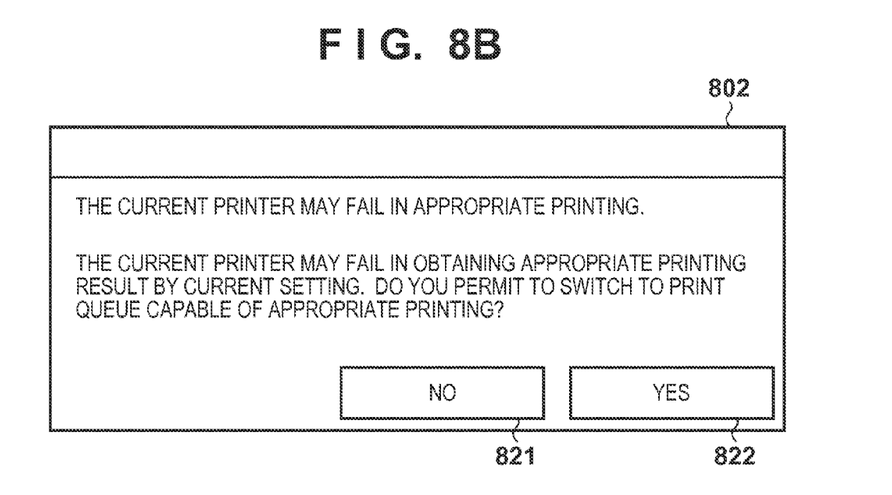

FIG. 8B shows a dialogue 802 that is an example of the dialogue displayed in step S709. In step S710, the UI control unit 222 determines the user selection in the dialogue 802. If a "YES" button 822 in the dialogue 802 is pressed, the selection to switch the print queue is done. In this case (YES in step S710), processing of switching the default print queue in a CUPS printing system 202 is performed (S711). This processing is the same as that performed in step S306 of the first embodiment and step S613 of the second embodiment. The current print job directly ends the processing.

When the operator changes the print queue of the print setting and inputs a print request again, the UI control unit 222 outputs the PDF print data and print setting information to the CUPS printing system 202 again. The CUPS printing system 202 can generate raster data from the output data and transfer it to the print data generation unit 221.

If a "NO" button 821 in the dialogue 802 is pressed (NO in step S710), the process advances to step S712. The UI control unit 222 outputs the PDF print data while maintaining the setting to use the current print queue.

After that, the PDF print data is sent to a raster data generation unit 211, the print data generation unit 221, and a print communication unit 204 and then output to a printer 12. In this case, printing can be executed while performing bidirectional communication and causing a status display unit 223 to display the information of the printer 12 and the necessary operation that changes in accordance with the information. In this embodiment, the user can select whether to generate a print queue capable of bidirectional communication and print using the generated print queue or continue printing using the current print queue without any change.

The above-described first to third embodiments may be executed only when printing is impossible or fails without using a print queue capable of bidirectional communication. For example, the user may be requested to do some operation or instruction during the processing. As an example, the embodiments may be executed only when CD-R printing is performed under the guidance of the operation procedure according to the state of the printer main body. That is, only when CD-R printing is performed, a print queue capable of bidirectional communication is newly generated, and printing is executed using the print queue capable of bidirectional communication. If print setting ensures printing execution without any problem even by a print queue incapable of bidirectional communication, printing is executed using the print queue incapable of bidirectional communication. That is, the embodiments may be executed by determining whether to generate a print queue capable of bidirectional communication in accordance with the printing method to be performed.

Although FIGS. 8A and 8B illustrate examples of the UI (reception unit) for receiving a user instruction, the arrangements are not limited to those.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-035182, filed Feb. 21, 2011, which is hereby incorporated by reference herein in its entirety.

What is claimed is:

1. An information processing apparatus comprising:
a determination unit configured to determine whether a communication protocol corresponding to a print queue selected by a user can acquire information from an image forming apparatus when processing a print job;
a switching unit configured, when said determination unit has determined that the communication protocol corresponding to the print queue cannot acquire the information from the image forming apparatus, to switch the print queue corresponding to the communication protocol of a determination target of said determination unit to a print queue corresponding to a communication protocol capable of acquiring the information from the image forming apparatus;
an execution unit configured to process the print job using the print queue switched by said switching unit;
an existence determination unit configured, when said determination unit has determined that the communication protocol corresponding to the print queue cannot acquire the information from the image forming apparatus, to determine whether the print queue corresponding to the communication protocol capable of acquiring the information from the image forming apparatus exists in the information processing apparatus; and
a generation unit configured to generate the print queue corresponding to the communication protocol capable of acquiring the information from the image forming apparatus when said existence determination unit has determined that the print queue corresponding to the communication protocol capable of acquiring the information from the image forming apparatus does not exist in the information processing apparatus,
wherein said switching unit switches the print queue to the print queue generated by said generation unit when said generation unit has generated the print queue corresponding to the communication protocol capable of acquiring the information from the image forming apparatus, or to the print queue whose existence has been determined by said existence determination unit when said existence determination unit has determined that the print queue corresponding to the communication protocol capable of acquiring the information from the image forming apparatus exists in the information processing apparatus.

2. The apparatus according to claim 1, wherein said determination unit determines whether the communication protocol corresponding to the print queue can acquire the information from the image forming apparatus when the information processing apparatus needs the information of the image forming apparatus upon processing the print job.

3. The apparatus according to claim 1, wherein said determination unit determines whether the communication protocol corresponding to the print queue can acquire the information from the image forming apparatus when the information processing apparatus requests an operation of a user upon processing the print job.

4. The apparatus according to claim 1, further comprising:
a storage unit configured to store image data corresponding to the print job in a storage area when said determination unit has determined that the information from the image forming apparatus cannot be acquired; and
an issuance unit configured to acquire the image data stored by said storage unit and to issue a print job corresponding to the image data,
wherein said execution unit discards the print job of the print queue corresponding to the communication protocol determined by said determination unit, and executes processing of the print job issued by said issuance unit using the print queue using the communication protocol capable of acquiring the information from the image forming apparatus.

5. The apparatus according to claim 1, further comprising:
a reception unit configured to receive, from a user, an instruction to cause said generation unit to generate the print queue corresponding to the communication protocol capable of acquiring the information from the image forming apparatus or not, or an instruction to cause said switching unit to switch the print queue to the print queue corresponding to the communication protocol capable of acquiring the information from the image forming apparatus and execute processing of the print job or not,
wherein said generation unit generates the print queue using the communication protocol capable of acquiring the information from the image forming apparatus when said reception unit has received the instruction to generate the print queue, and said switching unit switches the print queue to the print queue corresponding to the communication protocol capable of acquiring the information from the image forming apparatus when said reception unit has received the instruction to switch to the print queue and execute the processing of the print job.

6. A method of controlling an information processing apparatus, comprising:
   a determination step of determining whether a communication protocol corresponding to a print queue selected by a user can acquire information from an image forming apparatus when processing a print job;
   a switching step of, when it is determined in the determination step that the communication protocol corresponding to the print queue cannot acquire the information from the image forming apparatus, switching the print queue corresponding to the communication protocol of a determination target of the determination step to a print queue corresponding to a communication protocol capable of acquiring the information from the image forming apparatus;
   an execution step of processing the print job using the print queue switched in the switching step;
   an existence determination step of determining, when it is determined in the determination step that the communication protocol corresponding to the print queue cannot acquire the information from the image forming apparatus, whether the print queue corresponding to the communication protocol capable of acquiring the information from the image forming apparatus exists in the information processing apparatus; and
   a generation step of generating the print queue corresponding to the communication protocol capable of acquiring the information from the image forming apparatus when it is determined in the existence determination step that the print queue corresponding to the communication protocol capable of acquiring the information from the image forming apparatus does not exist in the information processing apparatus,
   wherein the switching step switches the print queue to the print queue generated in the generation step when the generation step has generated the print queue corresponding to the communication protocol capable of acquiring the information from the image forming apparatus, or to the print queue whose existence has been determined in the existence determination step when the existence determination step has determined that the print queue corresponding to the communication protocol capable of acquiring the information from the image forming apparatus exists in the information processing apparatus.

7. A non-transitory recording medium storing a program that causes a computer to function as:
   a determination unit configured to determine whether a communication protocol corresponding to a print queue selected by a user can acquire information from an image forming apparatus when processing a print job;
   a switching unit configured, when the determination unit has determined that the communication protocol corresponding to the print queue cannot acquire the information from the image forming apparatus, to switch the print queue corresponding to the communication protocol of a determination target of the determination unit to a print queue corresponding to a communication protocol capable of acquiring the information from the image forming apparatus;
   an execution unit configured to process the print job using the print queue switched by said switching unit;
   an existence determination unit configured, when said determination unit has determined that the communication protocol corresponding to the print queue cannot acquire the information from the image forming apparatus, to determine whether the print queue corresponding to the communication protocol capable of acquiring the information from the image forming apparatus exists in the information processing apparatus; and
   a generation unit configured to generate the print queue corresponding to the communication protocol capable of acquiring the information from the image forming apparatus when said existence determination unit has determined that the print queue corresponding to the communication protocol capable of acquiring the information from the image forming apparatus does not exist in the information processing apparatus,
   wherein said switching unit switches the print queue to the print queue generated by said generation unit when said generation unit has generated the print queue corresponding to the communication protocol capable of acquiring the information from the image forming apparatus, or to the print queue whose existence has been determined by said existence determination unit when said existence determination unit has determined that the print queue corresponding to the communication protocol capable of acquiring the information from the image forming apparatus exists in the information processing apparatus.

* * * * *